(12) United States Patent
Wirtz et al.

(10) Patent No.: US 6,799,675 B2
(45) Date of Patent: Oct. 5, 2004

(54) TOGGLE RETAINER FOR TOGGLE CONNECTIONS

(75) Inventors: Jorg Wirtz, Kamen (DE); Siefgried Schmidt, Bottrop (DE)

(73) Assignee: DBT GmbH, Lunen (DE)

( * ) Notice: Subject to any disclaimer, the term of this patent is extended or adjusted under 35 U.S.C. 154(b) by 0 days.

(21) Appl. No.: 10/300,982

(22) Filed: Nov. 21, 2002

(65) Prior Publication Data

US 2003/0095851 A1 May 22, 2003

(30) Foreign Application Priority Data

Nov. 22, 2001 (DE) .................................. 201 19 091 U

(51) Int. Cl.[7] .............................................. B65G 19/28
(52) U.S. Cl. .............................. 198/735.2; 198/860.2; 198/583
(58) Field of Search .................... 198/735.1, 735.2, 198/73.6, 860.1, 860.2, 583

(56) References Cited

U.S. PATENT DOCUMENTS

| | | | | |
|---|---|---|---|---|
| 4,733,771 A | * | 3/1988 | Grundken et al. | ....... 198/735.6 |
| 5,287,955 A | * | 2/1994 | Steinkuhl et al. | ........ 198/735.6 |
| 5,658,085 A | * | 8/1997 | Merten et al. | .............. 403/315 |
| 6,035,997 A | * | 3/2000 | Heninger et al. | ........ 198/735.2 |
| 2001/0020570 A1 | * | 9/2001 | Schmidt et al. | .......... 198/735.6 |

* cited by examiner

Primary Examiner—Christopher P. Ellis
Assistant Examiner—Mark A. Deuble
(74) Attorney, Agent, or Firm—Cook, Alex, McFarron, Manzo, Cummings & Mehler, Ltd.

(57) ABSTRACT

A toggle retainer for toggle connections of conveyor pans for chain scraper conveyers guide pans of mining machines conveyors etc with a securing plate (10) which engages across one of the locking extensions (8, 9) of a toggle and secures it in the accepting pocket (4), both ends (11, 12) of which can be inserted into an associated insertion pocket and retained therein by means of securing means (20) engaging through a locking hole (25, 26) in the insertion pocket and an accepting hole (14) in the securing plate (10). The securing means (20) comprise a sleeve-like deformable out outer part (21) especially from plastics material, with a reinforcing core (22) from harder material, especially a reinforcing core of metal.

12 Claims, 1 Drawing Sheet

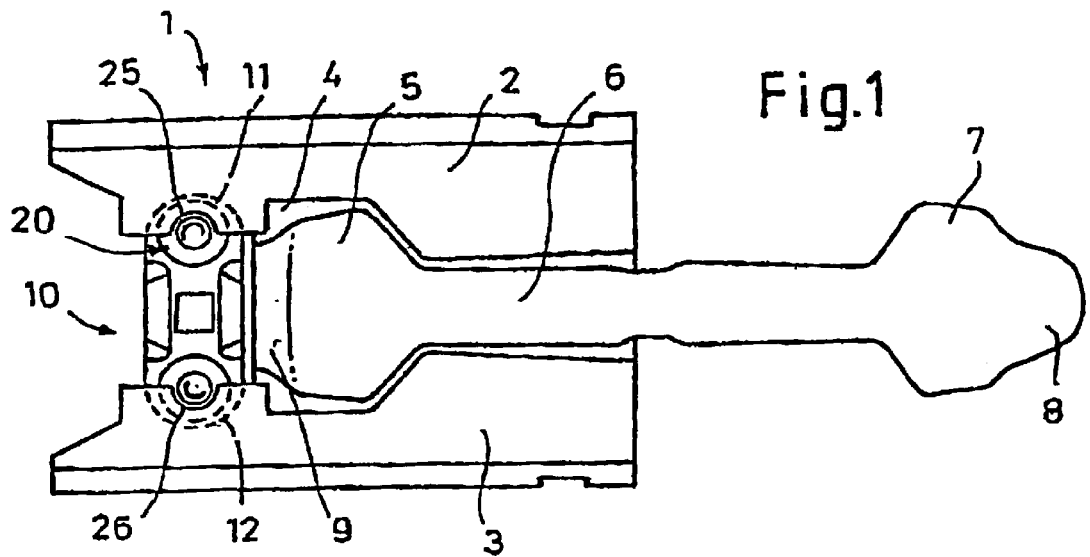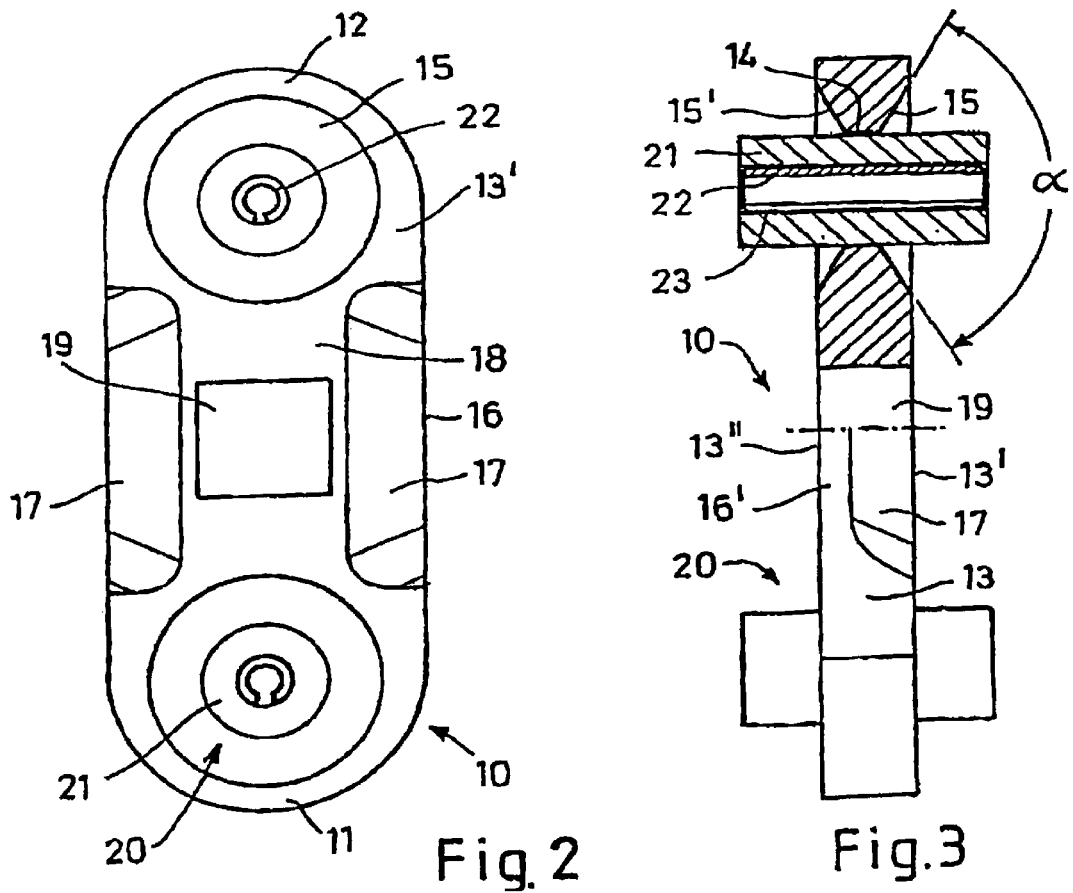

TOGGLE RETAINER FOR TOGGLE CONNECTIONS

The present invention to relates to a toggle retainer for toggle connections of conveyor pans for chain scraper conveyors, guide pans of mining machine conveyors etc, with a securing plate which engages across one of the locking extensions of a toggle and secures it in the accepting pocket and both ends of which can be inserted into an associated insertion pocket and retained therein by means of securing component which engages through a locking opening arranged in the insertion pocket and an accepting hole in the securing plate.

The chain scraper conveyors used in underground mining operations comprise individual conveyor pans which are joined together using toggle connections which are able to withstand tension and are movable within limits against each other so that the chain scraper conveyor can be moved in sections even with unevenness of the ground. The toggles (dog bones) are inserted here in accepting pockets, which are open at the side and are secured in them against falling out at the side using a toggle retaining device. The toggles employed by the DBT GmbH and widely distributed in the market have an extended bolt head with flat locking extensions at the axial ends of the toggle, which are engaged across by a removable securing plate. In the assembled condition and the secured condition, the securing plate engages at both ends in an associated insertion pocket and is secured in a locking hole in or on the insertion pocket by means of a securing device. Toggle connections are, in any case, not only applied in chain scraper conveyors but also for the connection of mining machine guide troughs hooked together in sections such as plough or plough chain guides.

A previously proposed toggle securing method is described in DE 295 02 953, in which the securing plate has a driving hole for a tensioning sleeve on one end and at its other end a driving hole for a plastics material pin with which it is retained in the locking hole of the insertion pocket. From DE 100 11 288 U1 a toggle securing device for toggle connections is known in which two securing means are formed from detachable deformable plastics material bolts, which can be inserted, into the locking openings. This offers the advantage of a very simple and fast assembly and disassembly. A disadvantage is however that the plastics material bolts can tear with excessive loading due to the unavoidable vibrations occurring in underground applications.

It is the aim of the present invention to produce an improved and cost-effective toggle retaining method, which is easily handled, and which secures the toggle reliably in the locking position and against falling out.

Accordingly the present invention is directed to a toggle retainer as described in the opening paragraph of the present specifications in which the securing means have a sleeve-like deformable outer part especially of plastics material, which is provided with a reinforcing core of harder material especially a reinforcement core of metal. By the combination of an outer part which is deformable and of low stiffness with a reinforcing core of higher stiffness, a cost-effective securing means is produced which can accept all the loading especially vibration with reduced risk of failing and nevertheless due to the deformable outer part can easily and quickly be assembled and disassembled.

According to a preferred embodiment the reinforcing core comprises a clamping sleeve. Alternatively the reinforcing core can comprise a rod of solid material. In both configurations it is advantageous if the clamping sleeve or the rod comprises rust-free steel so that the reinforcing core can withstand the underground environmental conditions, especially the damp climate. Advantageously two securing means are constructed in the same manner are provided so that the required stores holding for the securing means is simplified and minimised.

As is proposed in DE 100 11 288, it is preferable if in the toggle securing method according to the present invention both of the locking openings associated with the insertion pockets are made as open edge lock cut outs. Advantageously the accepting holes of the securing plate provided are on at least one securing plate side, preferably both sides, with a depression whose opening angle α amounts preferably to 120°. A suitably large free angle ensures that no briquetting arises between the securing means and the securing plate from coal dust or similar. Preferably the upper side of the securing plate is provided on the sides with preferably wedge shaped inclines. Both of the previously quoted measures operate against the frequently observed briquetting of coal dust in underground applications when mining coal. Apart from this these measures support the fast and problem free exchange of the pans or guiding troughs in the event of wear owing to the easier disassembly of the toggle securing and the toggle bolts.

With the toggle securing measures according to the present invention, the assembly and disassembly of the securing plate is effected for instance in that a securing plate with pre-assembled retention means is assembled onto one of the edge-open locking openings, whereby the securing plate is then pivoted using elastic deformation both of the securing means in the one locking cut out and also of the other securing means so that its free end is inserted into the locking opening of the other insertion pocket. To make this pivoting in easier, the securing plate in a preferred embodiment is configured with between the accepting holes a multi-angled disassembly opening is formed for the engagement of a disassembly tool. It is especially preferred if the disassembly opening is square and matched to the standard cross section of a ratchet tool drive head. The disassembly hole can especially be a square hole with a nominal size of 21 mm.

An example of a toggle retainer made in accordance with the present invention will now be described hereinbelow in relation to the accompanying drawing, in which:

FIG. 1 shows a schematic side view of a toggle inserted into a toggle pocket at one end and secured with a toggle retainer;

FIG. 2 shows a plan view of the securing plate of the toggle retainer according to FIG. 1; and FIG. 3 shows a side view partly sectioned, of the securing plate shown in FIG. 2 with securing means inserted.

FIG. 1 shows a toggle pocket 1, which can be welded onto the side wall of a side profile of a pan, not shown, of an underground chain scraper conveyor or a guide trough. The toggle pocket 1 comprises two toggle pocket side parts 2, 3, which are formed mirror-symmetric to each other and form between them an accepting pocket 4, in which the toggle head 5 of a toggle 6 is inserted. In FIG. 1 the right hand toggle head 7 of the single part toggle 6 lies, in the assembled condition, in an associated toggle pocket of an adjacently connected pan or guide trough, so that both conveyor pans are joined together by the toggle 6 firm against tension but however capable of limited angular movement against each other. The toggle 6 has at both toggle heads 5, 7 a flat possibly multiply stepped locking extension 8, 9 which forms in each case the axial end of the toggle 6 and has a substantially smaller height as opposed to the toggle head 5, 7. The forces arising between two adjacent conveyor pans or guide troughs owing to the movement of a chain scraper conveyor or the travel of a mining machine are taken by the shaft and the strong toggle heads 5, 7 of the toggle 6. The locking extentions 8, 9 of the toggle 6 on the other hand serve exclusively for securing the toggle 6 against lateral falling out from the toggle pocket 1 or from the accepting pocket 4 formed from these.

The retention of the toggle 6 in the toggle pocket 1 and the accepting pocket 4 is formed by the elongate retention plate 10 which is shown in detail in FIGS. 2 and 3 and their construction is described with reference to these Figures. As FIG. 1 shows the securing plate 10 lies both at its upper and also its lower rounded ends 11, 12 in an insertion pocket, not shown in detail, which for instance is formed by grooves in the side parts 2, 3 as is shown and published in detail in DE 100 11 288 to which reference is made specifically for further explanation. In the locked position shown, the ends 11, 12 of the securing plate 10 engage below sections of the toggle pocket side parts 2, 3 and at the same time engage on top of the locking section 9 of the toggle bolt 6 at right angles to its longitudinal axis, so that it is secured against falling out to the side from the accepting pocket which is open at the side. The securing plate 10 itself is retained in the locked position shown in FIG. 1 by means of special securing means 20 which, as is further explained below includes a deformable outer part (cover) and a significantly harder core with respect to the cover, in edge open locking apertures 25, 26 of the toggle pocket side parts 2, 3 of the toggle socket 1.

The construction of the securing plate 10 and the construction of the securing means 20 used with the securing plate 10 in accordance with the invention will now be explained with reference to FIG. 2 and FIG. 3. The securing plate 10 comprises an elongate flat body 33 with circular formed rounded ends 11, 12 which are provided in each case somewhat in the centre point of the rounding with an accepting hole 14, in which the securing means 20 is inserted. The plate body 13 is provided with a depression 15, 15' both on the upper side 13' and also on the under side 13" of the plate, whose opening angle a amounts to some 120°. The upper side 13' of the plate body 13 is cut away on both longitudinal edges 16 with a wedge shaped incline 17 rising towards the upper side 13' of the plate. The securing plate 10 tapers also immediately on the long sides 16 up to a narrow web 16' and has a full plate thickness only in the centre web 18 as can well be seen in FIG. 2. This central web 18 is provided centrally with a square cut out 19, whose dimensions are matched to the standard cross section of a ratchet tool driver and for instance they have a nominal diameter of about 21 mm. The depressions 15, 15' and the inclines 17 ease the disassembly of the securing plate 10 from the locked position as shown in FIG. 1, even when briquetting has occurred from fine coal deposits in the region of the toggle heads 5, 7 and the locking extensions 8, 9.

As indicated further above the retention of the securing plate 10 in the edge open locking cut outs 25, 26 of the insertion pockets or toggle pockets is effected by securing means 20 which comprise an elastically deformable plastic material sleeve 21 forming the outer part and a clamping sleeve 22 which is inserted in the central opening or boring 23 of the deformable plastics material sleeve 21 and forms the core of the securing means 20. The clamping sleeve 22 on the one hand increases the stiffness and the resistance capability and on the other hand the tensioning and clamping power of the securing means 20 in the accepting hole 14. The wall thickness of the plastics material sleeve 21 is dimensioned sufficiently large and amounts to some 12 mm in the preferred embodiment with the tensioning sleeve 21 in the core, the material for the plastics material sleeve 21 preferably can be a polyurethane such as for instance elastopal.

To assemble the securing plate 10 two identically constructed and formed securing means 20 can be inserted in the associated accepting holes 14 of the securing plate 10 which then after the quadrilateral pin of a ratchet head has been inserted into the assembly or disassembly opening 19, firstly one of the securing means 20, for instance the lower, is inserted into the lower locking cut out 26 and then by deforming or bending the lower and also the upper securing means is pivoted into the locking position. Alternatively in the assembly one of the two securing means is first driven into the associated accepting hole 14 so that only then does it engage through the locking hole 25 and the accepting hole 14. Deformation of both the securing means 20 occurs in this method of procedure only in the disassembly in which the securing plate 10 is pivoted out in the opposite direction from the locking position shown in FIG. 1.

Independently of the type of assembly of disassembly a means of retention is provided by the toggle retainer according to the invention which has a substantially higher stiffness than the previously used plastics material bolts and therefore makes possible a more secure tightening of the securing plate. The specialist will understand from the above description that a series of modifications to the securing plate, to the securing means and to the toggle pockets can be undertaken without leaving the area of protection of the claims.

What is claimed is:

1. A toggle retainer for toggle connections of conveyor pans for chain scraper conveyors, guide pans of mining machine conveyors etc with a securing plate which engages across one of the locking extensions of a toggle and secures it in the accepting pocket, both ends of which can be inserted into an associated insertion pocket and retained therein by means of securing means engaging through a locking opening in the insertion pocket and an accepting hole in the securing plate, in which the securing means comprise a sleeve-like deformable outer part, with a reinforcing core of metal.

2. A toggle retainer according to claim 1, in which the reinforcing core comprises a split taper sleeve.

3. A toggle retainer according to claim 1, in which the sleeve-like deformable outer part is made of plastics material.

4. A toggle retainer according claim 3, in which the clamping sleeve comprises rust-free steel.

5. A toggle retainer according to claim 1, in which two similarly constructed securing means are provided.

6. A toggle retainer according to claim 1, in which both of the locking openings associated with the insertion pockets are made as open edge locking cut outs.

7. A toggle retainer according to claim 1, in which the accepting hole of the securing plate is provided on at least one, of the securing plate sides with a depression.

8. A toggle retainer according to clam 7, in which the opening angle of the depression amounts to some 120°.

9. A toggle retainer according to claim 7, in which the accepting hole of the securing plate is provided on two sides of the securing plate sides with a depression.

10. A toggle retainer according to claim 1, in which the upper side of the securing plate is provided on the sides with preferably wedge shaped inclines.

11. A toggle retainer according to claim 1, in which between the accepting holes a multi-angled disassembly opening is formed for the engagement of a disassembly tool.

12. A toggle retainer according to claim 10, in which the disassembly opening is square and matched to the standard cross section of a ratchet head tool driver.

* * * * *